United States Patent [19]
Johnson et al.

[11] Patent Number: 5,557,740
[45] Date of Patent: Sep. 17, 1996

[54] METHOD AND SYSTEM FOR PROVIDING DEVICE SUPPORT TESTING FOR A PLURALITY OF OPERATING SYSTEMS

[75] Inventors: Richard H. Johnson; Douglas Noddings, both of San Jose, Calif.

[73] Assignee: International Business Machines Corporation, Armonk, N.Y.

[21] Appl. No.: 453,407

[22] Filed: May 30, 1995

[51] Int. Cl.$^6$ ................................................ G06F 11/00
[52] U.S. Cl. ............................ 395/183.14; 395/183.2; 395/183.16
[58] Field of Search ........................... 395/183.14, 183.2, 395/183.16

[56] References Cited

U.S. PATENT DOCUMENTS

| | | | |
|---|---|---|---|
| 4,327,408 | 4/1982 | Frissell et al. | 364/200 |
| 4,347,608 | 8/1982 | Appiano et al. | 371/16 |
| 4,591,973 | 5/1986 | Ferris, III et al. | 364/200 |
| 4,617,663 | 10/1986 | Lake et al. | 371/25 |
| 4,638,455 | 1/1987 | Yamazaki | 364/900 |
| 4,779,196 | 10/1988 | Manga | 364/200 |
| 5,033,049 | 7/1991 | Keener et al. | 371/23 |
| 5,218,605 | 6/1993 | Low et al. | 371/16.1 |
| 5,278,977 | 1/1994 | Spencer et al. | 395/575 |
| 5,301,325 | 4/1994 | Benson | 395/700 |
| 5,303,166 | 4/1994 | Amalfitano et al. | 364/551.01 |
| 5,361,336 | 11/1994 | Atchison | 395/275 |
| 5,361,346 | 11/1994 | Panesar et al. | 395/575 |

OTHER PUBLICATIONS

IBM Technical Disclosure Bulletin, vol. 28, No. 12, May, 1986 p. 5245.

*Primary Examiner*—Robert W. Beausoliel, Jr.
*Assistant Examiner*—Ly V. Hua
*Attorney, Agent, or Firm*—Benman Collins & Sawyer

[57] ABSTRACT

A method and system for testing a device driver utilized with a data processing system is disclosed. In a first aspect, the method comprises the steps of inputting a script file to a test engine to provide a test to the device driver, compiling the test engine across multiple operating system platforms. The method also includes sending a command that indicates the test is to be provided to the device driver and sending results of the test of the device driver back to the test engine. In another aspect, a system is disclosed for testing a device driver utilized in a data processing system. The system comprises a script file for providing a test of the device driver and a test engine for receiving the test from the script file. The system also includes a plurality of platform specific library routines for compiling the test engine and test across multiple operating system and multiple device types and for sending the test to the device driver, wherein the test engine receives the results from the test from the device driver upon receiving a system call from the test driver. Through the use of a system and method in accordance with the present invention, device driver tests can be made self-checking and require minimal human intervention to run the tests. In addition, the tests can be rerun at any time to retest new versions of device drivers and/or new versions of the operating system environments.

10 Claims, 9 Drawing Sheets

```

# write data in first file on the tape

type write 5 1024 byte blocks in 1st file
command write records = 5          result rc != -1
command write_filemark 1           result rc != -1
# test filemark positioning
type forward/reverse filemark
command forward_filemark 1         result rc != -1
command read records = 1           result data == 6
# test read block id if the drive is not an 8200/8205
if product_id has '82' skip 2
 command read_block_id             result rc != -1

command reverse_filemark 1         result rc != -1
command read records = 1           result rc == 0
command read records = 1           result data == 6
command rewind                     result rc != -1
# test locate block id if the drive is not an 8200/8205
if product_id has '82' skip 3
command locate_block_id            result rc != -1
command read records = 1           result data == 7
command rewind                     result rc != -1
```

METHOD AND SYSTEM FOR PROVIDING DEVICE SUPPORT TESTING FOR A PLURALITY OF OPERATING SYSTEMS

FIELD OF THE INVENTION

The present invention relates generally to computer peripheral device drivers and more particularly to testing such device drivers for a plurality of operating systems associated with data processing.

BACKGROUND OF THE INVENTION

Many, if not most, computer systems provide for linking a host computer operating system to one or more peripheral devices which are used as data storage media. For example, the AIX and OS/2 operating systems made by International Business Machines Corporation of Armonk, N.Y. can interface with several different types of data storage peripheral devices that have a so-called Small Computer System Interface (SCSI) interface format.

Included among SCSI devices are magnetic tape data storage devices, magnetic disk data storage devices, and optical disk data storage devices. Also included among SCSI devices are medium changer library devices, each of which contains several data storage devices. In medium changer devices, one of the data storage disks at a time can be selected and then engaged with a transport element within the device for accessing data of a storage device.

Indeed, a multiplicity of data storage devices are made by various manufacturers, each of which may transfer data in accordance with its own unique operating command sequence. It is nonetheless desirable that a host operating system be capable of communicating with as many different types of data storage devices as possible, so as not to unduly restrict the ability of the operating system to interact with available data storage devices.

Accordingly, to permit the host operating system to communicate with several different types of data storage devices, the host operating system ordinarily includes software modules referred to as device drivers. For each data storage device sought to be used by the host operating system, the host operating system must include an associated device driver which is tailored for communicating with the particular device. Thus, each device driver functions as an intermediary between the operating system and the data storage device that is associated with the device driver. More particularly, the device driver receives input/output (I/O) requests from the operating system and then issues commands to its associated data storage device to satisfy the I/O requests.

Many computer systems require device support for a large number of different peripheral devices. Oftentimes, these different devices are typically tape drives, optical devices, magnetic heads, etc. In conventional systems, a device driver must be written for each class of device. In addition, each operating system such as OS/2, UNIX, etc., will require a separate device driver for each operating system. Hence, as is seen, there can be many different device drivers written for each device type or class that is to operate with the computer system as well as for each operating system associated with each device. For example, the ADSM server requires device support for a large number of SCSI peripheral devices on several operating system platforms. Among these platforms are AIX, SUN Solaris and HP/UX. It must be economical to add new devices on all these platforms, and others in the future and it must also be economical to port the entire set of device support to a new operating system platform in the future.

Thus, for each type of data storage device sought to be used by an operating system, the operating system must include an associated device driver. It will be appreciated that each separate operating system must in turn include a plurality of device drivers that are designed for the operating system. Unfortunately, such duplication of system design effort is time-consuming and costly.

For example, it is possible to provide an individual device driver for each class of device and each operating system environment. If there are three device classes and three operating system environments, this means 9 device drivers must be written. As the number of classes and platforms grows, the number of drivers required can become very large.

Device support is necessary for a large number of SCSI peripheral devices on several operating system platforms. It is very important to be able to test the device support to ensure that the devices are operating properly. In the past, device drivers were tested by writing individual test programs or by manual test procedures. This introduces long delays in the test phase of a development effort. In addition, it can be difficult to rerun the old tests for new devices or new operating system environments. Traditional techniques for testing device support for large numbers of devices in multiple operating system environments are therefore oftentimes too time and resource consuming to meet short product development schedules.

Accordingly, what is needed is a method and system for testing the device drivers necessary for each operating system. In addition, what is needed is a system or method for testing a number of device drivers required for each device. In so doing, it is important that the operating system not be substantially modified. The system and method should be one in which there is minimal additional cost to the operating system. The present invention addresses such a need.

SUMMARY OF THE INVENTION

The present invention provides a way to automate the testing of device support software for multiple SCSI device classes and types in multiple operating system environments. The tests can be run unattended and are self-checking.

A method and system for testing a device driver utilized with a data processing system is disclosed. In a first aspect, the method comprises the steps of inputting a script file to a test engine to provide a test to the device driver, compiling the test engine across multiple operating system platforms. The method also includes sending a command that indicates the test is to be provided to the device driver and sending results of the test of the device driver back to the test engine.

In another aspect, a system is disclosed for testing a device driver utilized in a data processing system. The system comprises a script file for providing a test of the device driver and a test engine for receiving the test from the script file. The system also includes a plurality of platform specific library routines for compiling the test engine and test across multiple operating system and multiple device types and for sending the test to the device driver, wherein the test engine receives the results from the test from the device driver upon receiving a system call from the test driver.

Through the use of a system and method in accordance with the present invention, device driver tests can be made self-checking and require minimal human intervention to run the tests. In addition, the tests can be rerun at any time to retest new versions of device drivers and/or new versions of the operating system environments. Accordingly, a system and method in accordance with the present invention has significant utility over conventional testing methods.

DETAILED DESCRIPTION OF THE INVENTION

The present invention relates to an improvement in providing for device support for a plurality of operating systems for a computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
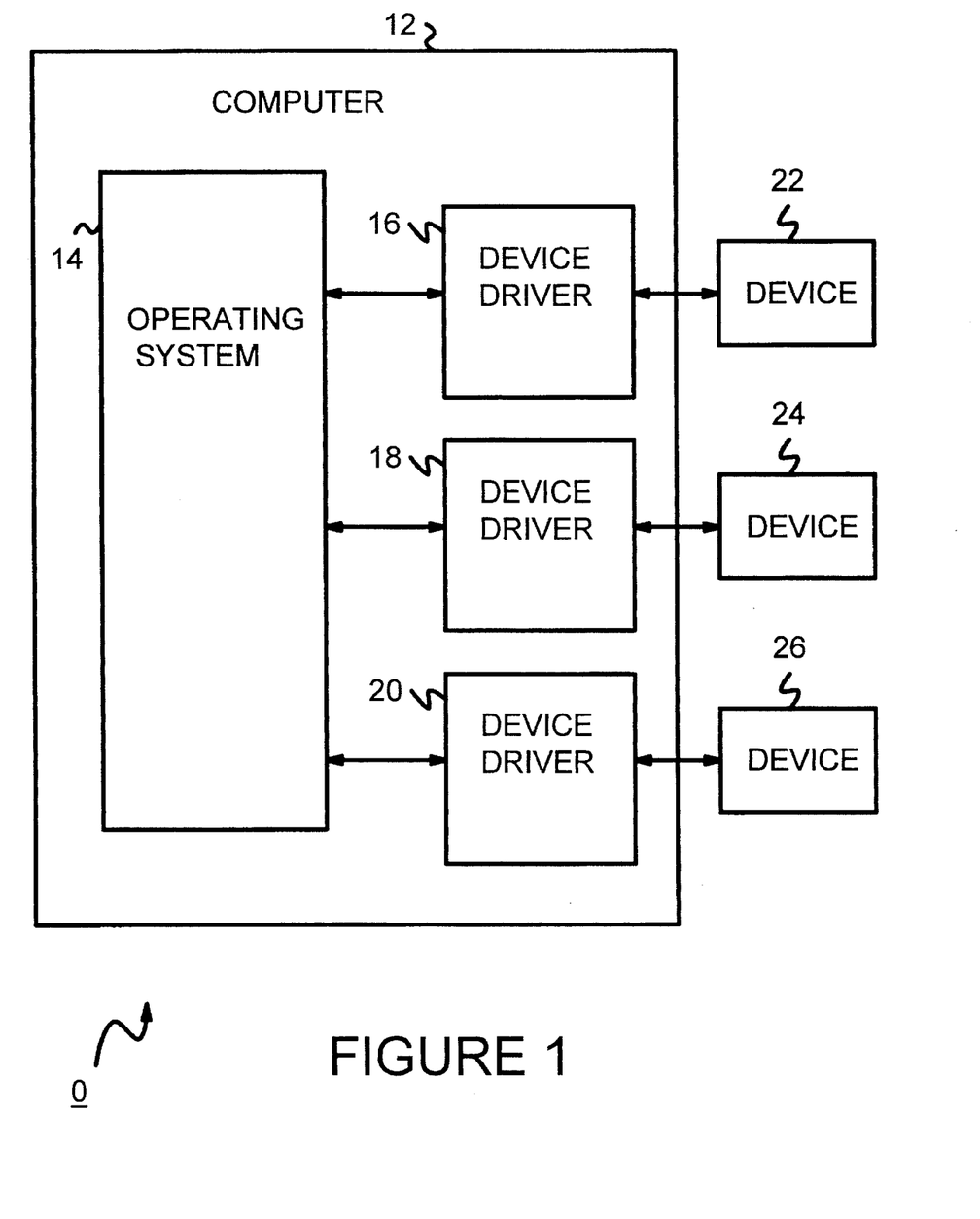
FIG. 1 is a conventional operating system environment for a device driver.

Referring initially to FIG. 1, a data transfer system is shown, generally designated 10. As shown, the system 10 includes a computer 12 with associated operating system 14. In the presently preferred embodiment, the computer 12 is a type RISC System/6000 or HP900 or Sun computer and the operating system 14 is an AIX, HP/US or Solaris operating system.

FIG. 1 shows that the system 10 includes a plurality of computer peripheral device drivers for controlling respective data storage devices. More particularly, the system includes first, second, and third device drivers 16, 18, 20 for respectively controlling first, second, and third data storage devices 22, 24, 26. It is to be understood that the system 10 can include greater or fewer device drivers.

In accordance with principles well-known in the art, each device driver 16, 18, 20 receives data input/output (I/O) requests from the operating system 14. Further, each device driver 16, 18, 20 executes each I/O request by issuing an appropriate command sequence to its associated data storage device 22, 24, 26 to cause the device 22, 24, 26 to transfer data in accordance with the I/O request. Thus, each device driver 16, 18, 20 is an intermediary between the operating system 14 and the associated data storage device 22, 24, 26. Stated differently, each device driver 16, 18, 20 functions as a data transfer controller between the operating system 14 and the associated data storage device 22, 24, 26.

Figure 2:
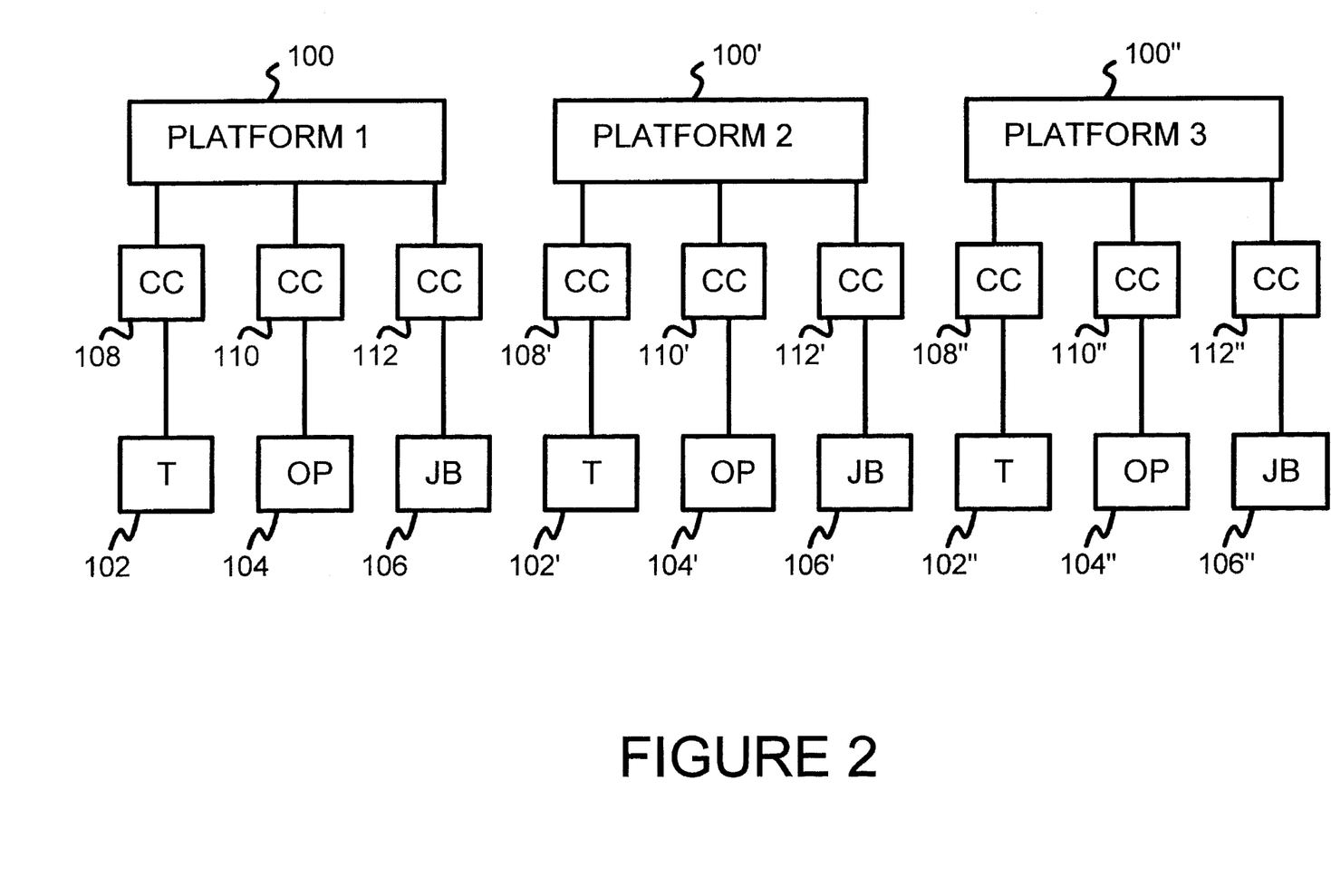
FIG. 2 is a chart showing the utilizing of device drivers over a variety of operating systems.

Referring now to FIG. 2, what is shown is a matrix of operating system platforms 100, 100', 100" and their associated device drivers 102–106. As is seen, there are several device drivers written for each operating system platform 100. Hence, for each operating system separate command codes 108–112, 108'–112' and 108"–112" must be written for each device driver. Hence, even in a single operating system platform, the command codes 108–112, 108'–112' and 108"–112" are different. In so doing, it is difficult to support a typical storage device such as a tape over a plurality of operating systems without writing a significant amount of command code for each device driver. Accordingly, it is critically important to test such device drivers on an ongoing basis to ensure the reliability of the devices. It has been found that as more device drivers are written either for a particular operating system or across multiple operating systems that these tests have become more critical.

It should be well understood by one of ordinary skill in the art that although the above example has been shown with three operating system platforms, any number of operating system platforms could be utilized. In fact, as the number of operating system platforms increases, it is readily apparent that the amount of code that must be written for the device drivers as well as the number of tests required for those device drivers increases exponentially.

Copending U.S. patent application Ser. No. 08/453,306 entitled "Method and System for Providing Device Support For A Plurality of Operating Systems" filed on June 30, 1995 and assigned to the assignee of the present application takes to advantage of the fact that much of the code between device drivers is common and that all of the operating systems do support the common SCSI command format. This application is hereby incorporated by reference in its entirety in the present application. Hence, it is possible upon combining that commonality to substantially reduce the amount of code written for a particular device and also eliminates the need for an individual device driver written for each operating system.

In a system in accordance with the above-identified application, a common code device driver can support multiple classes of devices and be built for execution on various platforms. In so doing, a method and system for supporting SCSI devices over various operating system platforms is provided. This as above discussed will substantially reduce the overall amount of code that needs to be generated for each individual device and for each individual platform.

Figure 3:
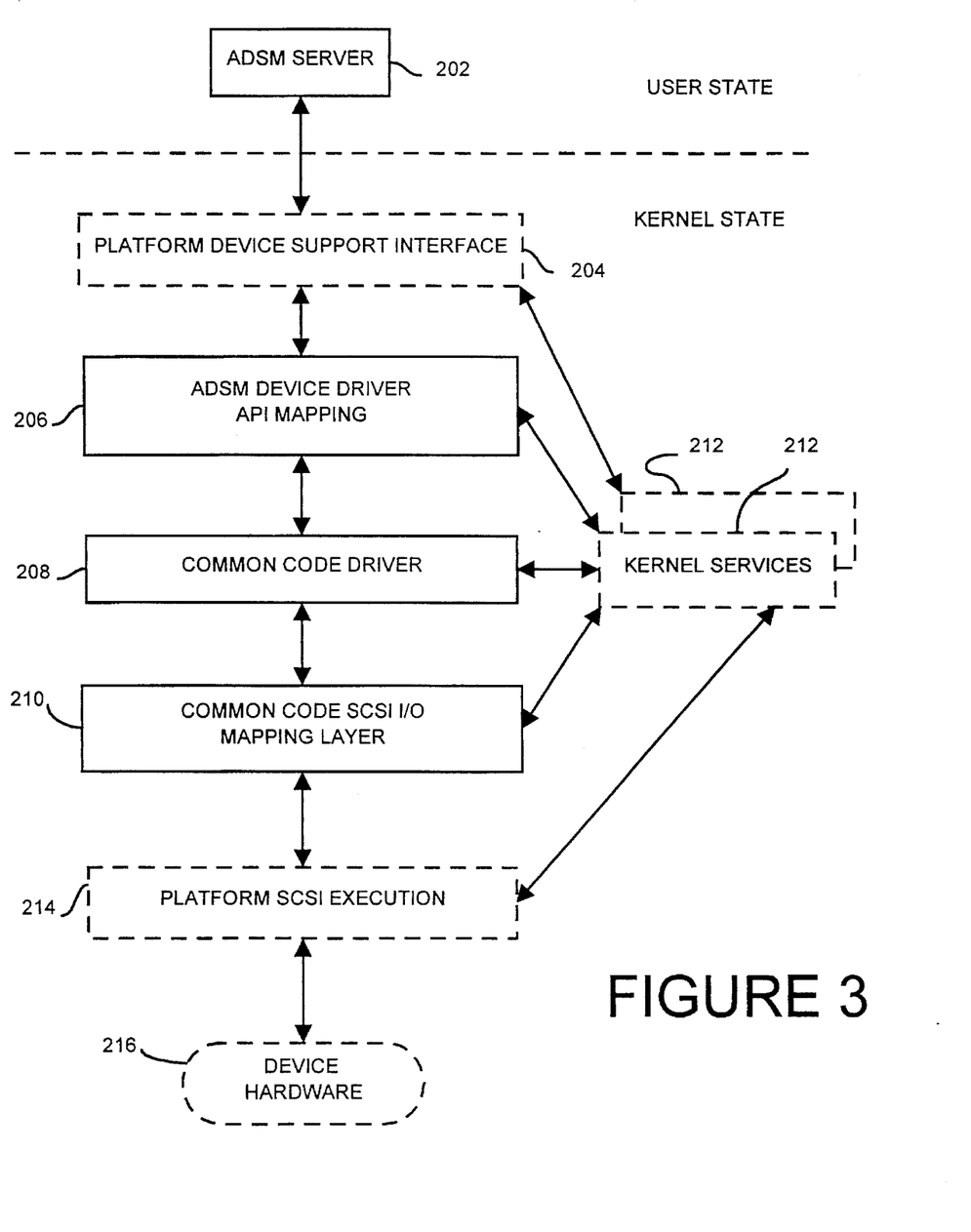
FIG. 3 is a system in accordance with the present invention for providing operating system independent SCSI device support.

To more specifically understand this method and system, present invention, refer now to the following detailed discussion in conjunction with FIG. 3.

In such a system, a server 202 provides a system call to a device support interface 204 which is specific to a specific platform. The interface 204 in turn provides that call to mapping layer 206. The mapping layer 206 with input from the plurality of operating system services 212 for a particular platform turns a request from the server 202 into a common format. Operating system services 212 for a particular operating system platform can be encapsulated in macros that expand at compile time to calls to the appropriate platform routines. These include such services as locking, error logging, pinning/unpinning memory, etc.

In a preferred embodiment, the common format would then be provided to common code driver 208. The interface 204, mapping layer 204 and common code driver are all responsive to a plurality of commands from the various operating systems. The common code driver 208 portably device types of a particular operating system as well as provided across device types of different operating systems. By utilizing this common code driver 208, individual device drivers do not have to be written for each device and also the amount of code required for each device drivers is substantially reduced for each operating system. This in turn reduces the overall design time for the support of various devices over multiple operating system platforms.

In order to allow the common code device driver 208 to support multiple classes of SCSI devices and be built for execution on various platforms, all source modules are resident in one of the following categories:

1. Modules common across all devices and platforms.
2. Modules common across all devices and all UNIX platforms.
3. Modules for device specific processing.
4. Platform specific device driver interface modules.
5. Platform specific SCSI I/O execution interface modules.

A common code SCSI I/O mapping layer 210 is provided via data from the common code driver 208 and command signals from the operating system services 212. Thereafter, platform specific (PS) SCSI execution 214 can take place. The device hardware 216 is then provided from this SCSI execution.

Through the use of this system, a common code device driver provides support for various generic I/O capabilities to SCSI devices. Accordingly, the common code device driver provides support for these generic I/O capabilities to SCSI devices:

1. device driver configuration.
2. device configuration.
3. open/close device.
4. read/write device.
5. I/O control (Special device status and control functions)

Figure 4:
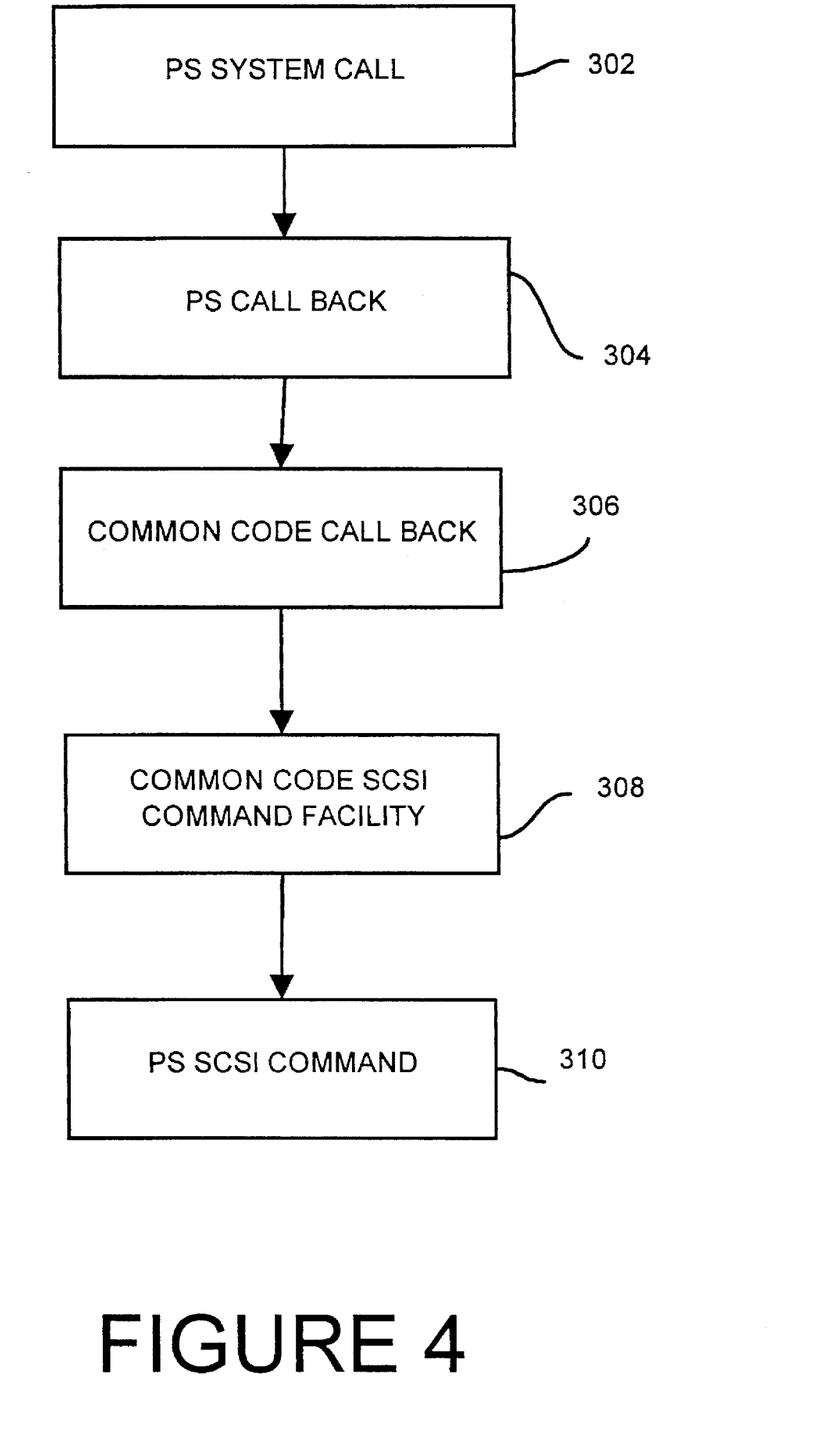
FIG. 4 is a flow chart of the operation of the system of FIG. 3.

To more clearly describe the operation of the common device driver code, refer now to a flow chart of the operation of the common code driver. Referring now to FIG. 4, what is shown is a generalized flow chart of the operation of a system in accordance with the present invention. As is seen, first a platform specific system call is made indicating that a particular operation is to occur, via step 302.

Thereafter, a platform specific call back is made to ensure that system call is proper via step 304. Next, a common code call is provided responsive to the platform specific call back, via step 306. The common code call is platform neutral. Accordingly this common code is portably provided across all platforms and device drivers.

Figure 4A:
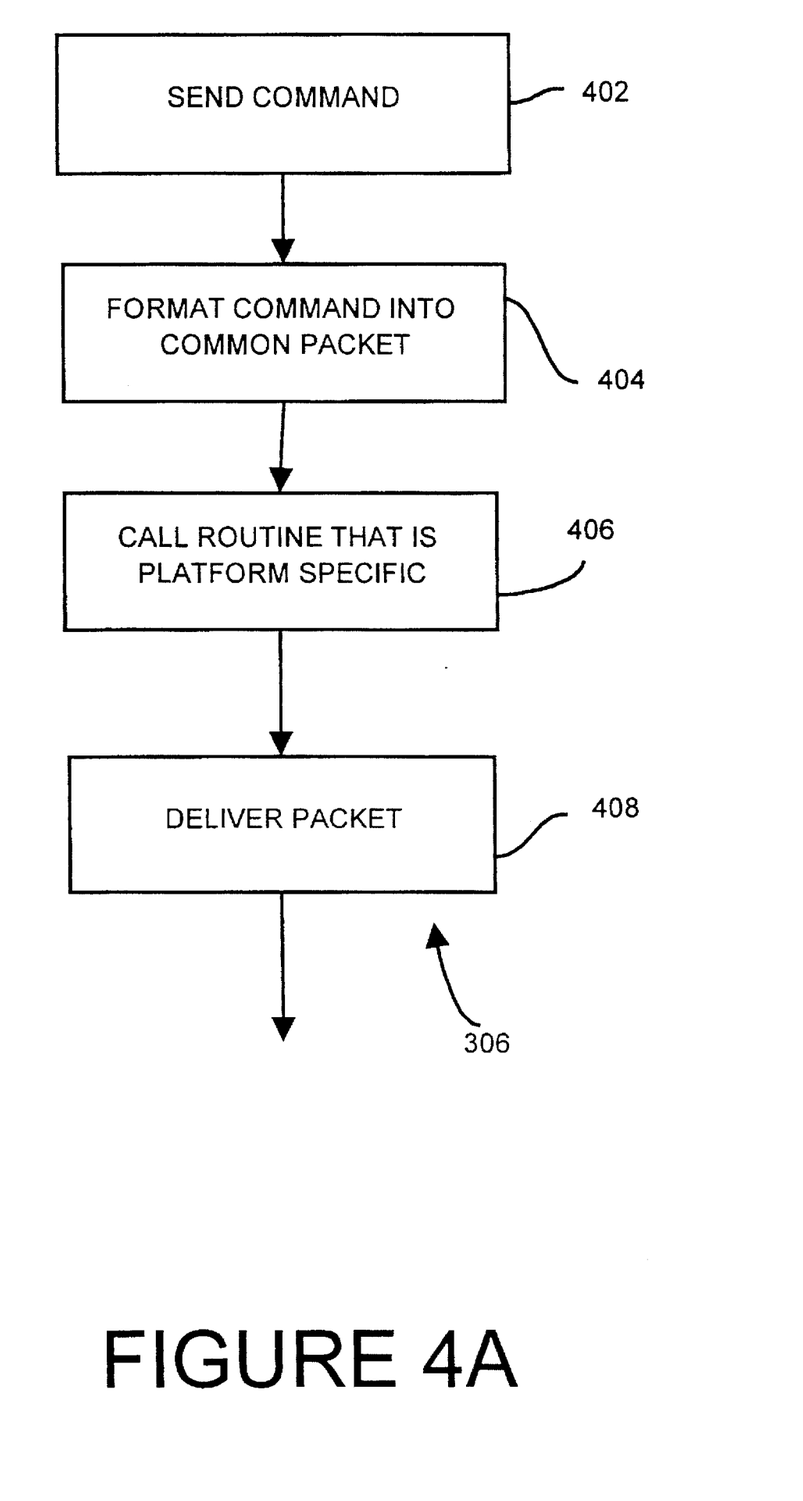
FIG. 4A is a flow chart showing the creation of a common code device driver in accordance with FIG. 4.

To more specifically describe this common code call, refer now to FIG. 4A which is a more detailed flow chart of the common code call, step 306. In this step a command is received from a platform specific routine from the operating system via step 402. This command is then acted upon which can result in the formatting of one or more SCSI packets, in this case a SCSI command, which can be portably provided to all of the operating systems platforms, via step 404. The portability of this common packet across multiple device drivers and multiple operating systems allows for a significant reduction in the overall design time for device drivers. Accordingly, logic, devices and code is shared across all device drivers.

Referring back to FIG. 4, after the common call back is provided via step 306, the specific routines of the operating system are not relevant. All of the device logic is independent of the operating systems. Thereafter a common code command SCSI facility is invoked via step 308. Finally, a platform specific command is invoked, via step 310 to provide the device drivers for the particular SCSI device.

Figure 5:
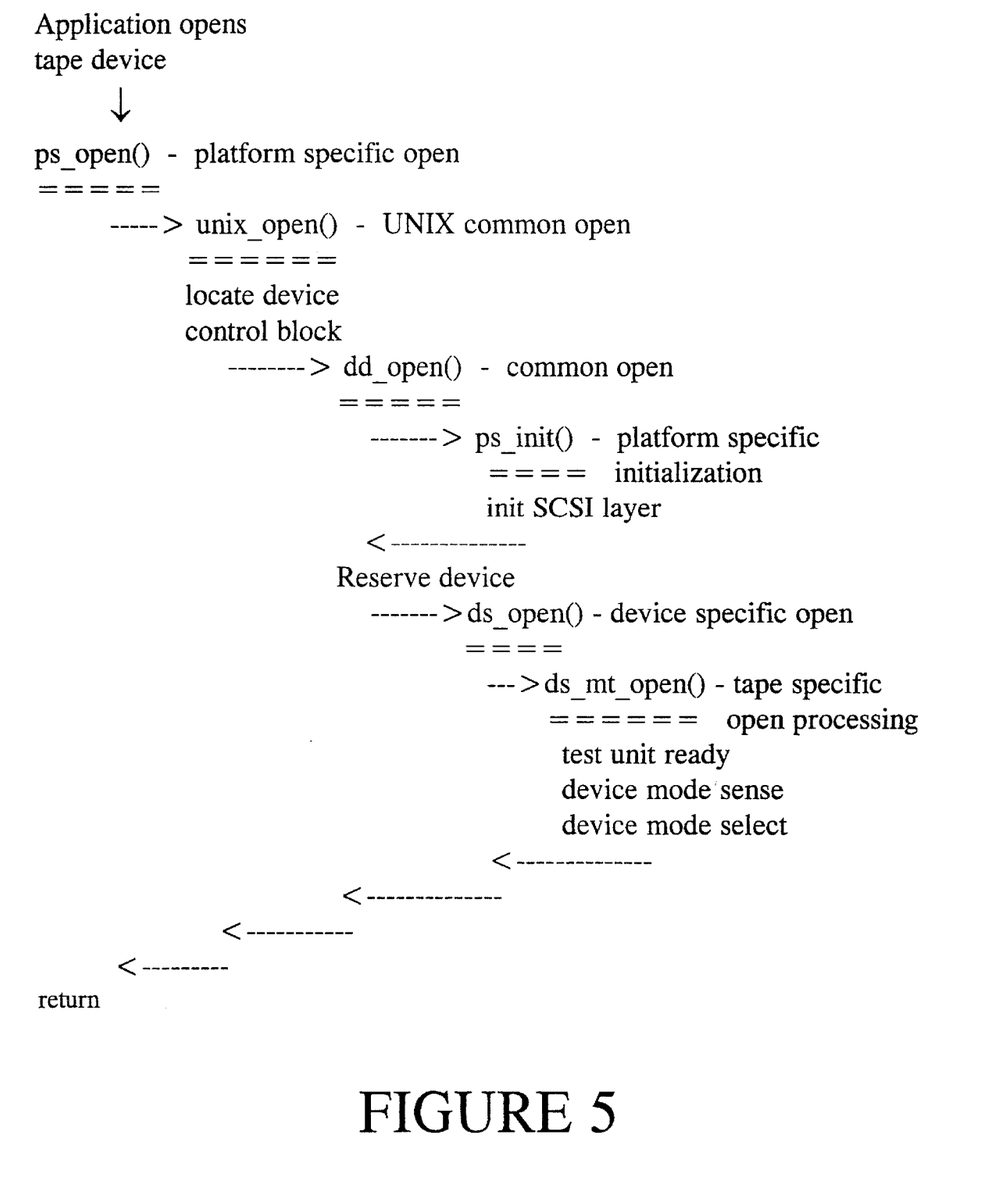
FIG. 5 is code related to a particular implementation of the flow chart of FIG. 4.

In a specific example of the above generalized flow chart of FIG. 4, FIG. 5 illustrates an abbreviated logic flow for an open operation to a tape device.

Figure 6:
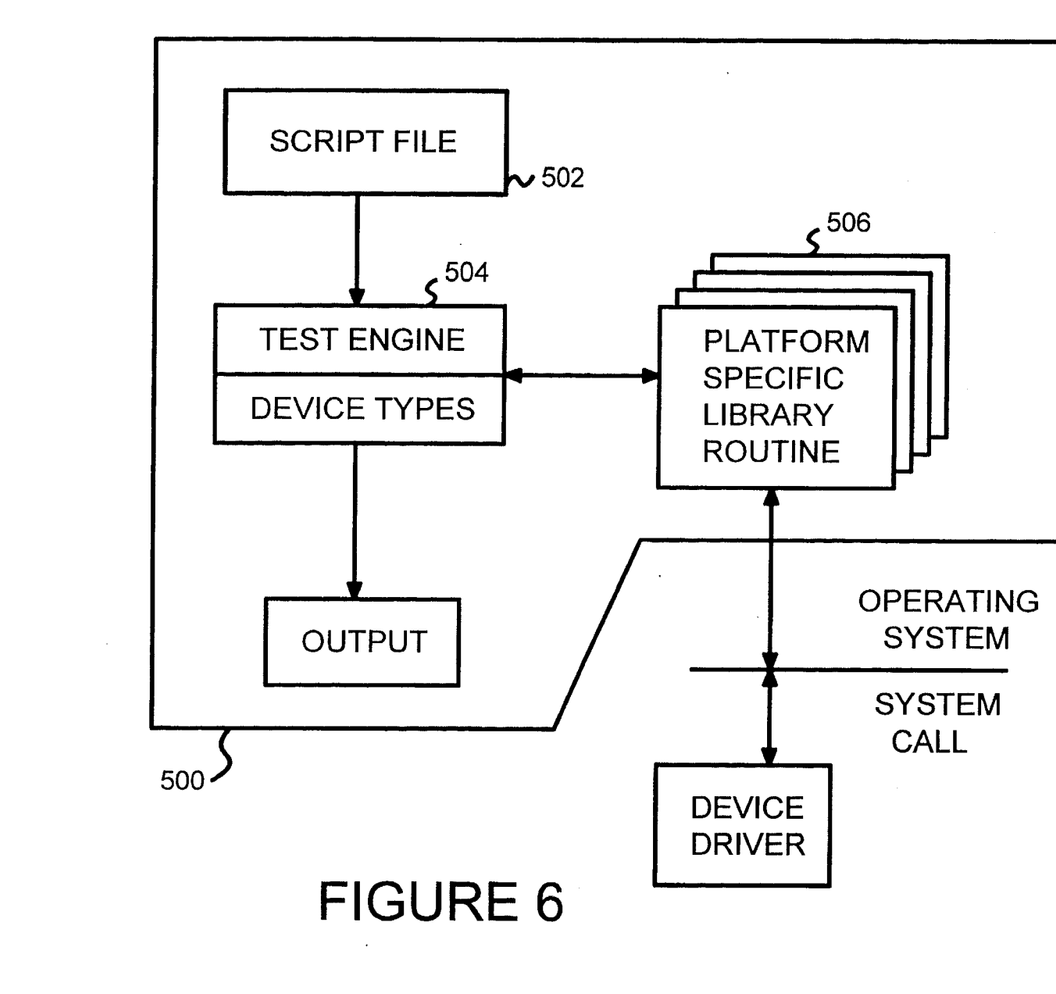
FIG. 6 shows a block diagram of an automated testing system for a device driver in accordance with the present invention.

The above-identified system operates very effectively to reduce the amount of code necessary to write device drivers. The present invention in conjunction with above-identified system provides an automatic testing scheme to ensure that the device drivers are operating properly. FIG. 6 shows a block diagram of an automated test system 500 for a device driver in accordance with the present invention.

A script file 502 sends a set of tests to the device driver 501. What is meant by script file in the context of the present application is a set of instructions which indicates which device driver function is to be tested and the response that is to be received. The script file 502 is provided to a test engine 504. The test engine 504 is compiled across a plurality of operating system platforms and a plurality of device types via a plurality of libraries of platform specific routines 506. The script file 502 is written in a specialized test tool language that allows testing the following device driver functions:

1. open/close of a device special file.
2. read/write data to the device.
3. I/O control operations to the device.

Figure 6A:
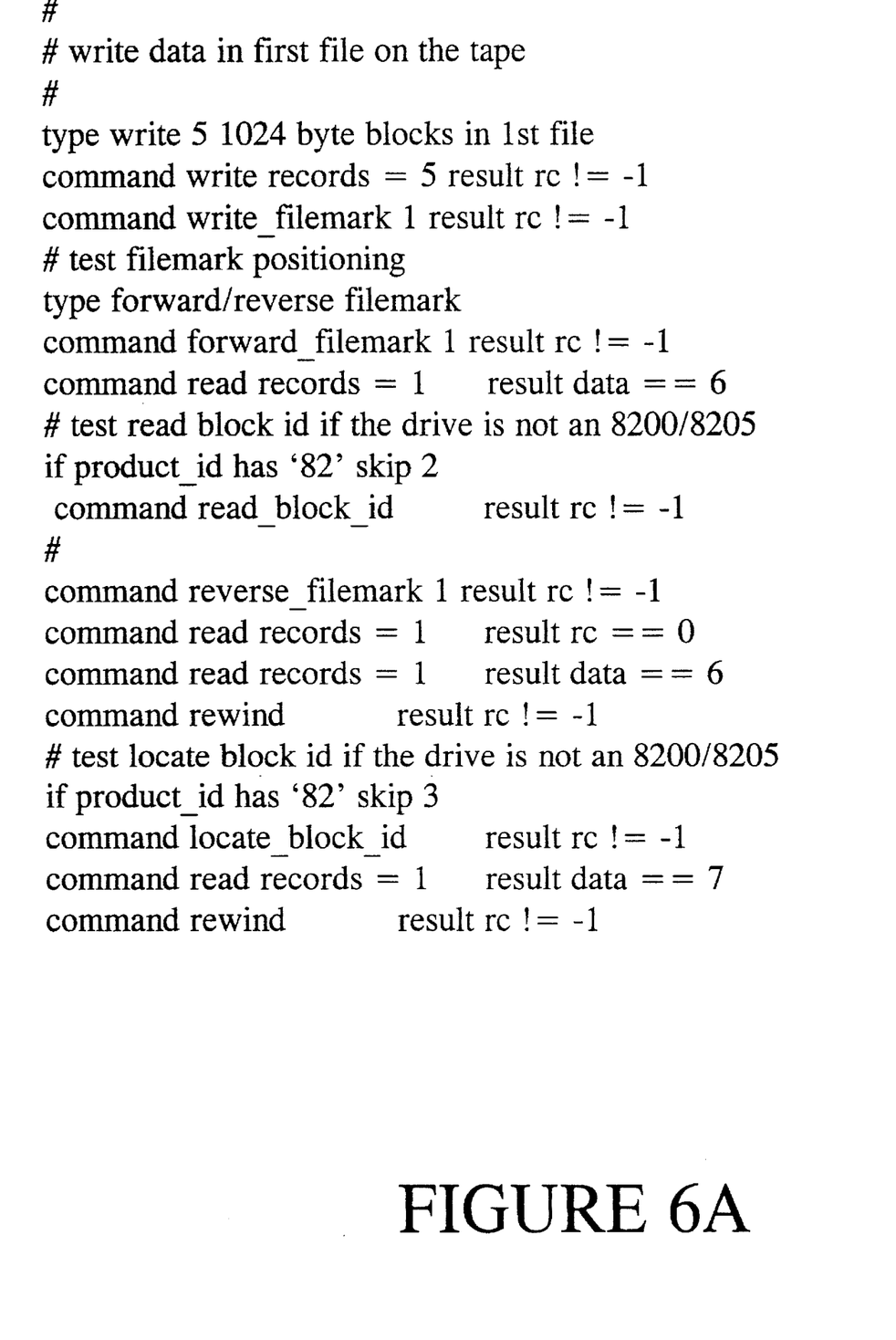
FIG. 6A shows an example of a script file utilized in the automated testing system of FIG. 6.

FIG. 6A shows a typical script file, in this case a script input file for writing data into a first file on a tape.

Each command in the script language allows for the specification of the expected result returned by the driver when the command is executed. This allows the tests to be self-checking. Incorrect results cause error messages to be produced and an error return code to be set by the test engine 504 when it exits.

Figure 7:
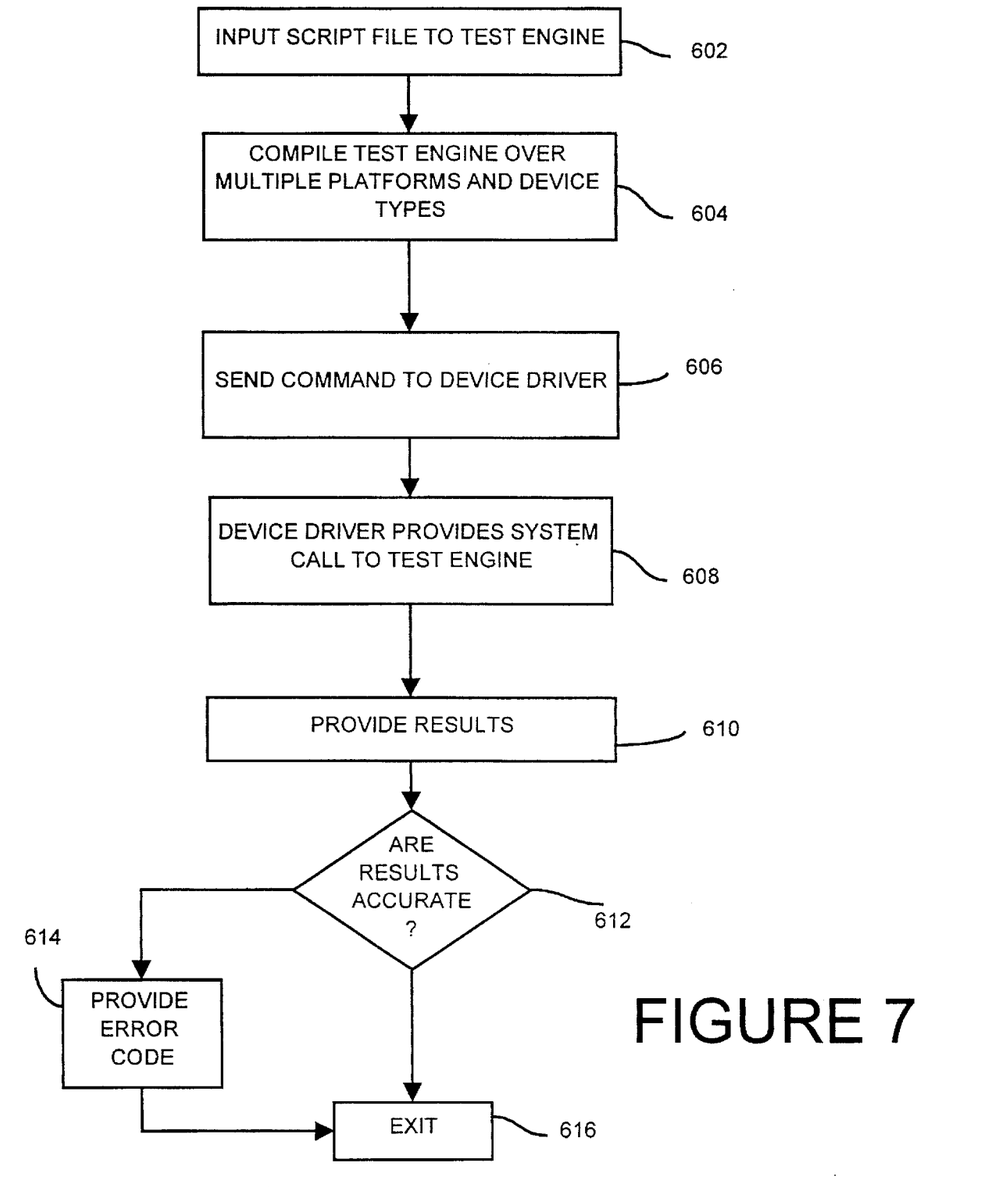
FIG. 7 is a flow chart of the operation of the automated testing system of FIG. 6.

To more particularly describe the method and system in accordance with the present invention refer now to FIG. 7, which is a flow chart of the operation of the automated testing system 500.

As is seen the script file which indicates the test to the device driver is input to the test engine, via step 602. The test engine is then compiled across multiple platforms and multiple device types, via step 604. Thereafter a command is sent from the testing facility to the device driver for initiating a test, via step 606. The device driver then provides a system call to the test facility, via step 608. The result from the device driver is then provided to the test facility via step 610. The accuracy of the result is then determined, via step 612. If the result is accurate then the test is exited, via step 614. If the result is not accurate an error code is provided and the routine is then exited, via step 616.

The above-described automated testing system has the following advantages:

ADVANTAGES:

A single set of test tools (i.e., optical, library and tape) that can be run on a plurality of server platforms.

A test case script language that allows the creation of self-checking tests for any SCSI device of the above three classes. Either batch or interactive modes of running test cases can be accomplished.

Device driver tests can be made self-checking and thus require only minimal human intervention to run tests. Tests can be rerun at any time to retest new versions of the device drivers and/or new versions of the operating system environment. The same tests can be run on a plurality of operating system environments that are supported by the present invention. This greatly reduces the effort to create test cases. Tests can be run either in batch mode or interactively. The same test for a class of SCSI devices can be run against any specific model in that class.

Although the present invention has been described in accordance with the embodiments shown, one of ordinary skill in the art will readily recognize that there could be variations to the embodiments and those variations would be within the spirit and scope of the present invention. For example, although the present invention has been described in the context of a particular type of device driver construct, one of ordinary skill in the art will readily recognize that the automated testing scheme of the present invention will operate in a variety of device support environments. The key element is the ability to compile tests over a variety of operating systems and device types. Accordingly, many modifications may be made by one of ordinary skill in the art without departing from the spirit and scope of the appended claims.

What is claimed is:

1. A method for testing a device driver utilized with a data processing system, the method comprising the steps of:
   (a) inputting a script file to a test engine to provide a test to the device driver;
   (b) compiling the test engine across multiple operating system platforms;
   (c) sending a command that indicates the test is to be provided to the device driver; and
   (d) sending results of the test of the device driver back to the test engine.

2. The method of claim 1 in which results sending step (d) further comprises the steps of:
   (d1) providing a system call from the device driver to the test engine; and
   (d2) providing the results of the test to the test engine.

3. The method of claim 2 in which the results sending means (d) further comprises steps of
   (d3) determining if the results are accurate; and
   (d4) providing an error code to the test engine if the results are not accurate.

4. The method of claim 1 in which the compiling step (b) includes compiling the test engine across multiple device types.

5. The method of claim 4 in which the multiple operating system platforms comprise UNIX, RISC and the AIX operating systems platforms.

6. The method of claim 5 in which multiple device types comprise optical, tape and jukebox storage devices.

7. A system for testing a device driver utilized in a data processing comprising:
   a script file for providing a test of the device driver;
   a test engine for receiving the test from the script file; and
   a plurality of platform specific library routines for compiling the test engine and test across multiple operating system and multiple device types and for sending the test to the device driver, wherein the test engine receives the results from the test from the device driver upon receiving a system call from the test driver.

8. The system of claim 7 in which the multiple operating system platforms comprise UNIX, RISC and the AIX operating systems platforms.

9. The system of claim 7 in which multiple device types comprise optical, tape and jukebox storage devices.

10. A computer program product for testing a device driver utilized with a data processing system, the computer program product comprising:
    (a) a computer readable medium containing program instructions of the computer program product;
    (b) an instruction for inputting a script file to a test engine to provide a test to the device driver;
    (c) an instruction for compiling the test engine across multiple operating system platforms;
    (d) an instruction for sending a command that indicates the test is to be provided to the device driver; and
    (e) an instruction for sending results of the test of the device driver back to the test engine.

* * * * *